Feb. 20, 1934.          G. W. SWIFT, JR          1,948,142
BLANK FEEDING MACHINE
Filed June 13, 1933          4 Sheets-Sheet 1
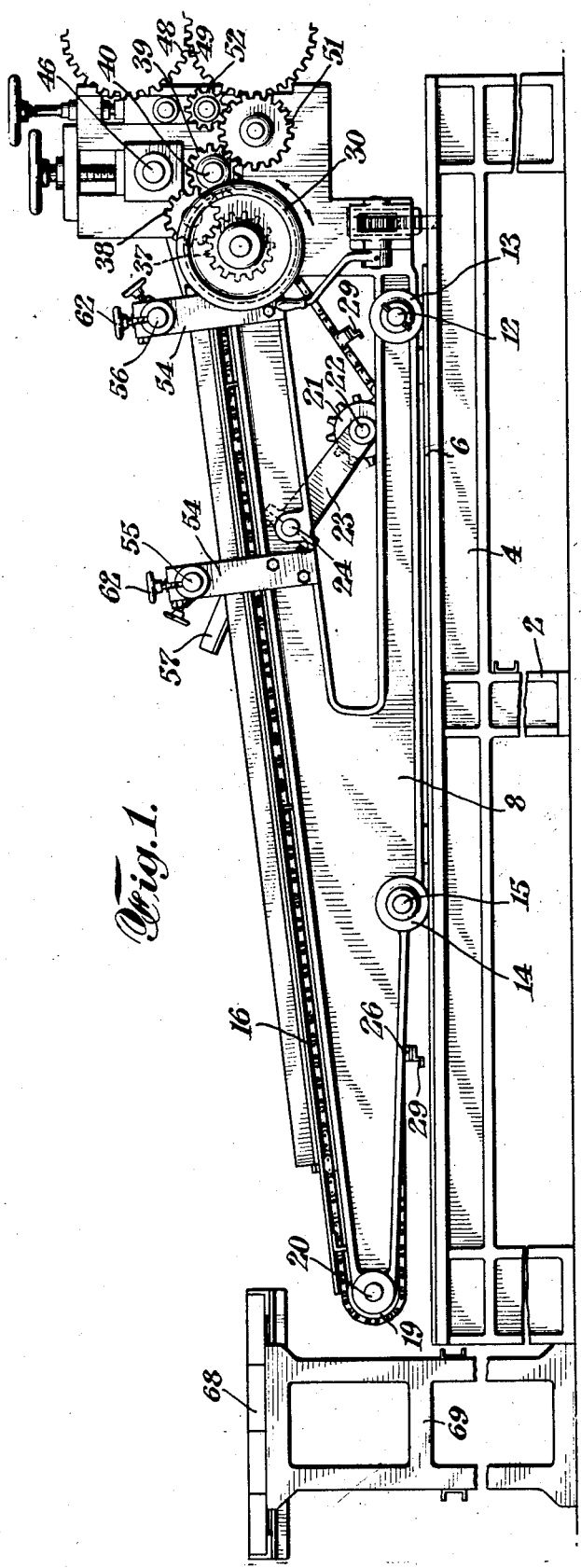
INVENTOR
George W. Swift, Jr.
BY Knight Bros
ATTORNEYS

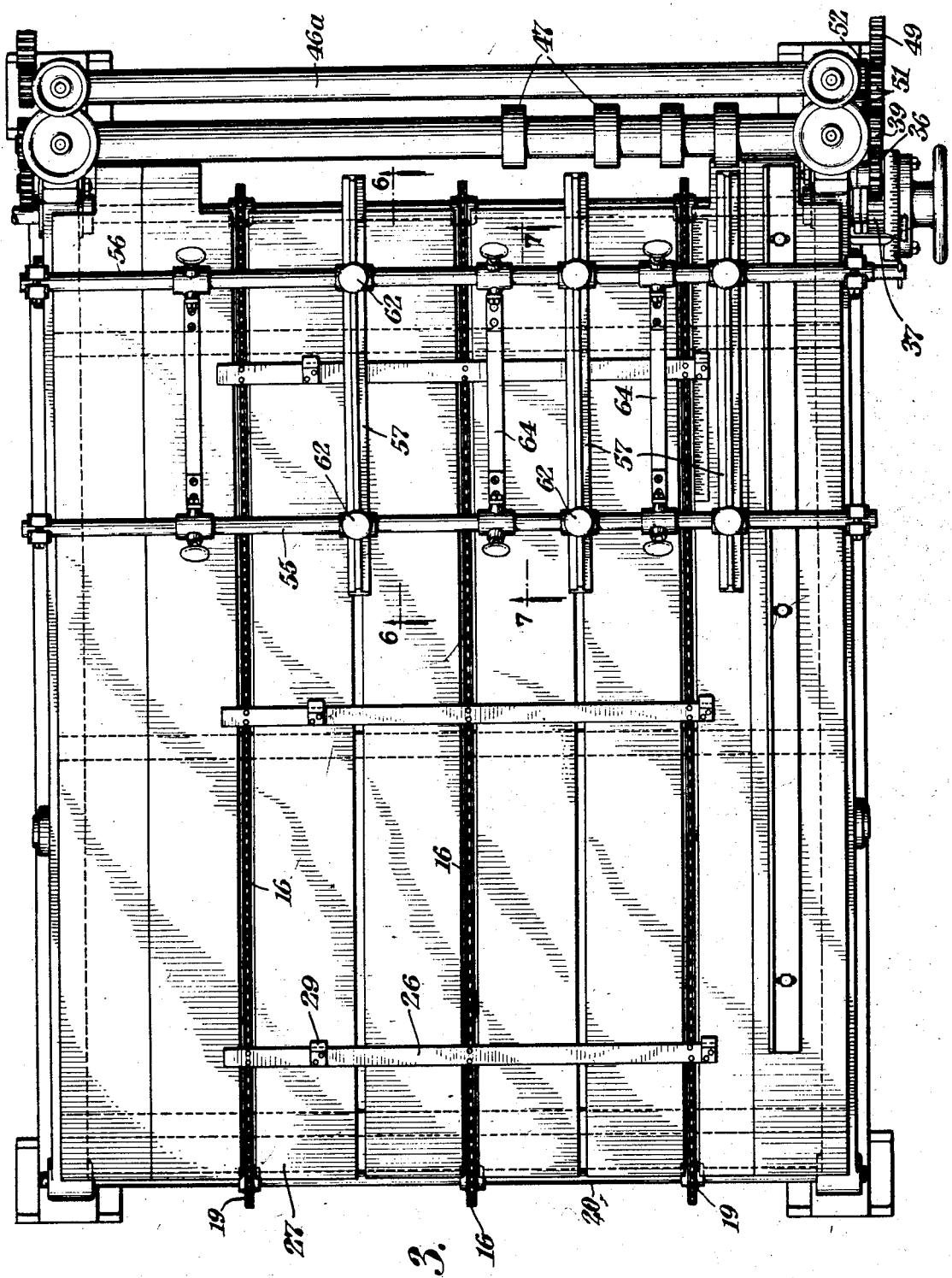

Feb. 20, 1934.  G. W. SWIFT, JR  1,948,142
BLANK FEEDING MACHINE
Filed June 13, 1933  4 Sheets-Sheet 3
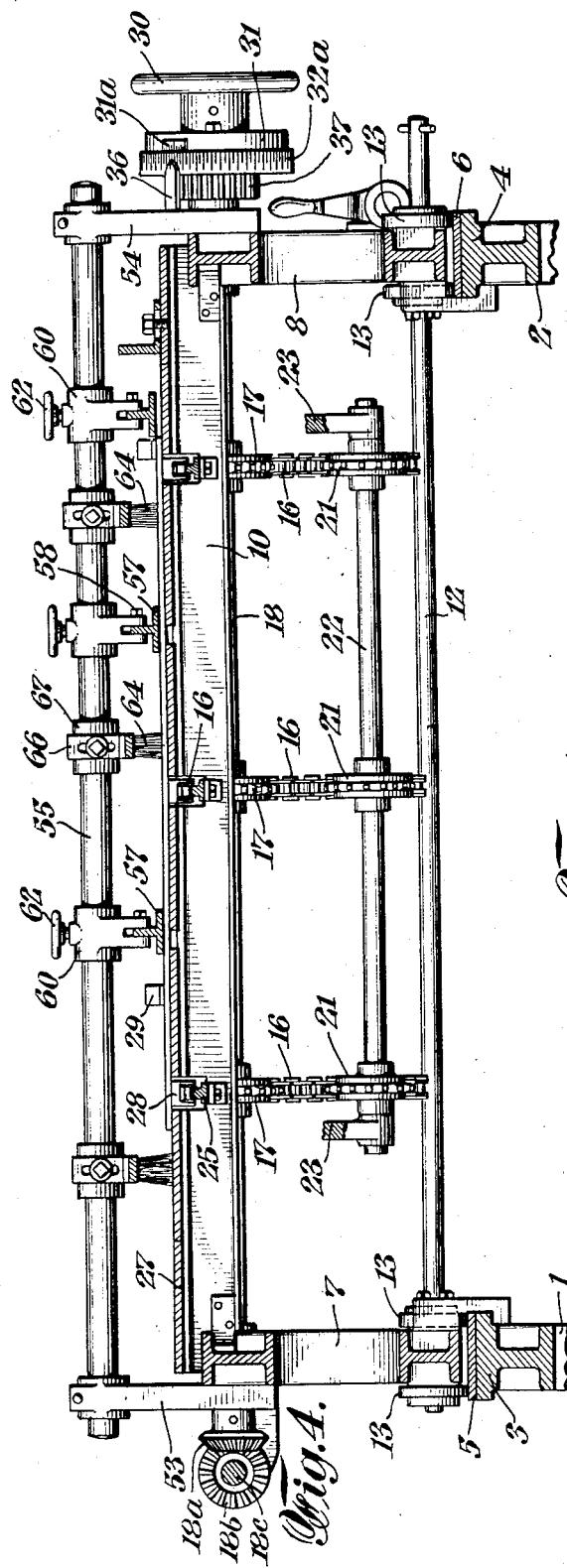
INVENTOR
George W. Swift, Jr.
BY Knight Bro
ATTORNEYS

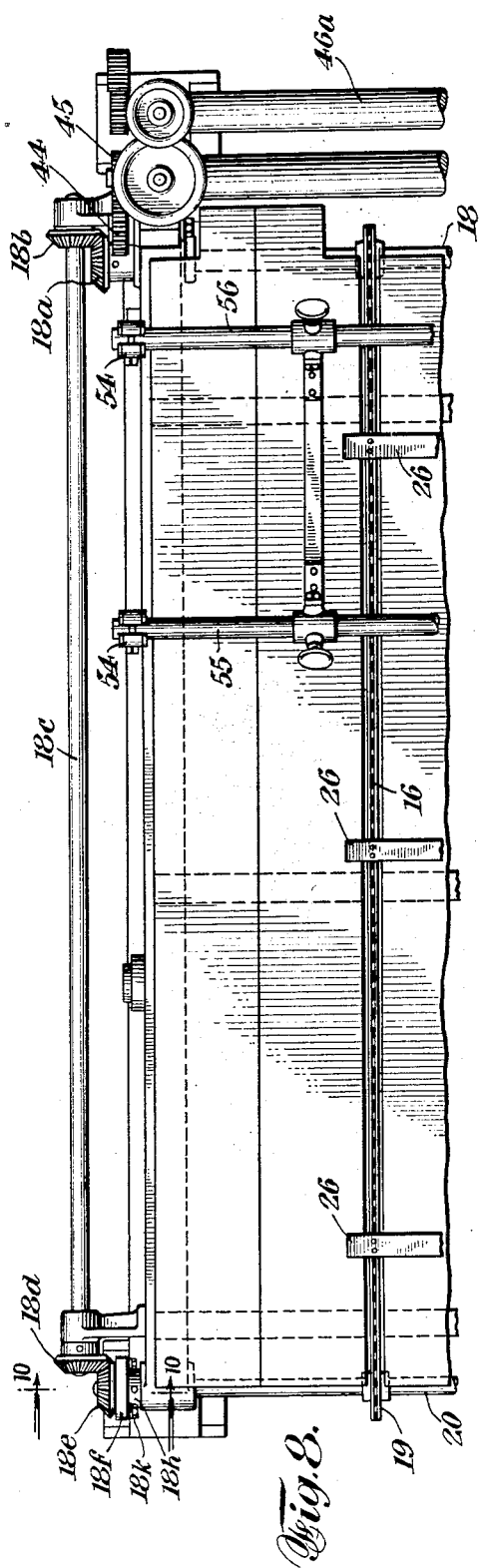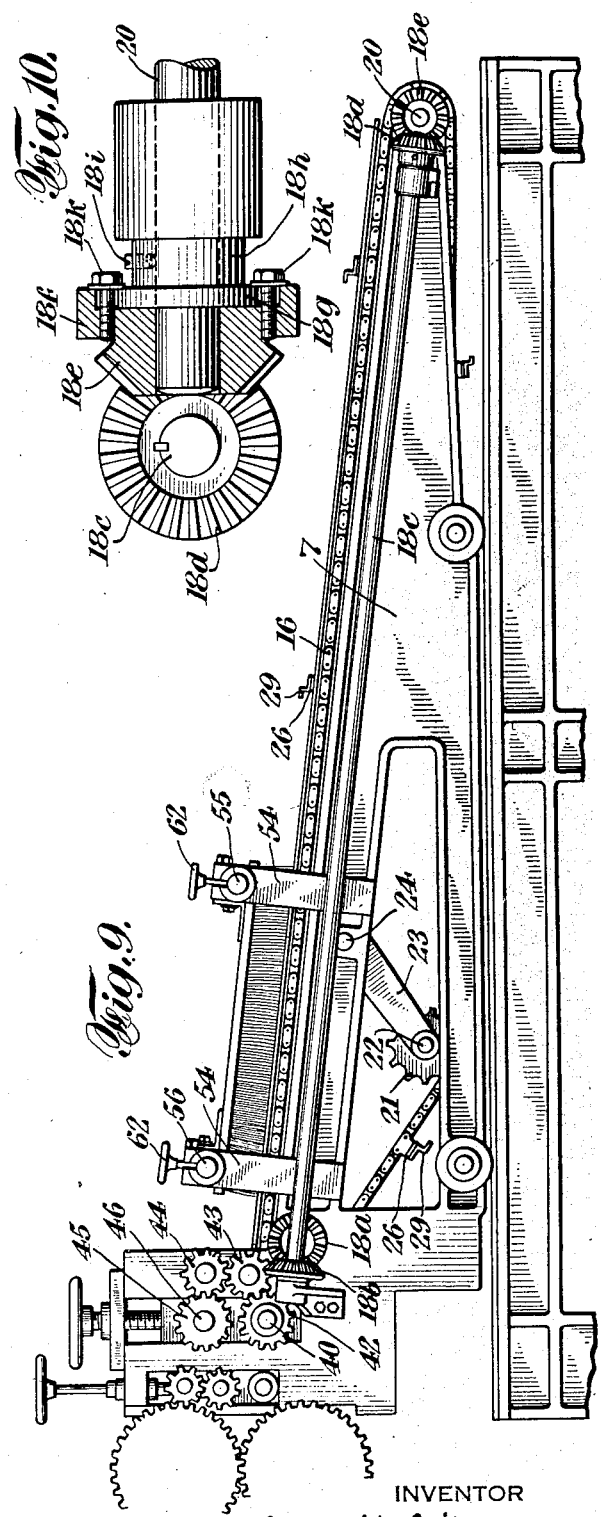

Patented Feb. 20, 1934

1,948,142

UNITED STATES PATENT OFFICE 1,948,142

BLANK-FEEDING MACHINE

George W. Swift, Jr., Bordentown, N. J., assignor to George W. Swift, Jr., Inc., Bordentown, N. J., a corporation of New Jersey Application June 13, 1933. Serial No. 675,534

14 Claims. (Cl. 271—45)

This invention relates more especially to that type of blank-feeding machines in which the initial placement of the blanks on an endless belt or conveyor, determines the timed sequence of their delivery to another machine as well as the particular parts of the blanks which are to be operated upon by the latter machine. Blank-feeding mechanism of this type for feeding blanks to creasing and slotting mechanisms, is shown and described in U. S. Patent No. 1,353,087, which was granted in my name under date of September 14, 1920.

The primary object of my present invention is to provide an improved construction and arrangement of parts in blank-feeding mechanism of this character for securing greater accuracy and uniformity in the blank-feeding operation as well as greater precision in the registration of the blanks in respect to certain operations to be performed thereon in another machine. For this purpose, my present invention contemplates means of improved construction whereby blanks of various sizes and thicknesses may be accurately positioned and constrained to move in a given plane of feed under the automatic action of the blank-feeding mechanism which delivers said blanks in properly timed order and sequence to other mechanisms. My invention further contemplates improved blank-feeding mechanism whereby blanks of heavy material such for example as double-faced corrugated board, may be accurately registered and delivered without interruption to their forward movements for the purpose of presenting said blanks with precision to the mechanisms which are to perform certain desired operations thereon.

One of the particular objects of my invention is to provide blank-feeding mechanism of improved construction for flattening and registering curled or warped blanks of relatively thick or heavy material during the feeding operation. For this purpose, my invention contemplates an endless belt conveyor of improved construction which comprises a plurality of laterally-spaced endless belts; blank-feeding bars or members arranged transversely with respect to said belts and connected thereto; front and rear drive shafts operating thereon and positively geared together; plates or feed table sections arranged between and in the common plane of movement of the upper runs of the laterally-spaced endless belts; and rigid rails or supports underlying the upper runs of said endless belts for maintaining them in substantially the plane of said plates or feed table sections, said blank-feeding bars or members being slidably supported by the plates or feed table sections. The rigid rails or supports below the upper runs of the laterally-spaced endless belts or chains as well as the plates or feed table sections preferably extend substantially the full distance between the front and rear drive shafts. Arranged in advance of the forward power shaft of the endless belt conveyor and preferably operating in a plane to which the blanks may be confined throughout the operations performed thereon, are paired feed rolls which positively engage the blanks one after another and maintain them in the predetermined order and sequence for securing an accurate presentation of the blanks to the mechanisms operating thereon. In the past, the operation of endless conveyor blank-feeding machines at high speeds has not been satisfactory, due to the fact that the endless conveyor has not been suitably constructed for smoothly resisting the very considerable shock transmitted to the conveyor by each successive blank as it is suddenly engaged by one of the blank-pushing members or bars. As an example, the use of high speed feeding mechanisms of the character referred to in connection with machines for making boxes of corrugated board may be cited. Thus, in dealing with curled or warped blanks, serious drawbacks have been met with due to the fact that more or less foreshortening of the blanks as well as inaccurate registry of said blanks has caused troublesome imperfections in the finished articles such, for example, as the failure of the flaps to meet when folded on the boxes due to improperly positioning and locating the slots and creases in the blanks. In this connection, the present invention contemplates blank-pushing members or bars of suitable form to confine the rear edges of the blanks; laterally-spaced ironing bars suspended above the inclined feed table for flattening out the curls and warps in the blanks; and suitable brushes or sweeps for moving the blanks into proper registry against the blank-pushing members or bars.

According to the embodiment of my invention shown on the drawings, a blank-feeding unit is constructed and arranged to be easily and expeditiously moved into and out of association with the machine to which it is intended to deliver blanks. For this purpose, my invention contemplates a carriage for the conveyor and associated feed rolls; and operating connections between said feed rolls and the endless conveyor drive shafts including a vernier gear adjustment whereby refined adjustments of the endless conveyor with respect to the feed rolls may be had. By means of this construction, the blank-feeding unit can be retracted from the associated machine, separately adjusted and returned to operative position for delivering blanks in properly timed order and sequence without appreciable lost motion in the feed of the blanks to and through the mechanisms which operate thereon.

A preferred embodiment of my invention is shown on the drawings suitable for feeding blanks constructed of corrugated board to a machine of the character shown and discribed in my copending application on machines for creasing, slotting and printing blanks, which was filed in the U. S. Patent Office under date of May 3, 1933 and Serial No. 669,156.

In the drawings—

Figure 1 is a side elevation of blank-feeding mechanism embodying my improvements, parts being broken away.

Figure 2 is a vertical longitudinal section of the same.

Figure 3 is a top plan view of the same, parts being broken away and parts being omitted.

Figure 4 is an enlarged vertical transverse section corresponding to the line 4—4 of Figure 2.

Figure 5 is an enlarged transverse section on the line 5—5 of Figure 2 with the chains removed, parts being broken away and parts shown in elevation.

Figure 6 is a slightly enlarged section on the line 6—6 of Figure 3 with a blank in passage through the constricted channel for removing the curls and warps from the blanks as they are being delivered to the feed rolls.

Figure 7 is a similar section on the line 7—7 of Figure 1.

Figure 8 is a fragmentary top plan view corresponding to Figure 3 and showing parts omitted in Figure 3.

Figure 9 is a side elevation of the machine from the side opposite to that shown in Figure 1.

Figure 10 is an enlarged detail section corresponding to the line 10—10 of Figure 8.

Referring more particularly to the drawings, the stationary frame of the machine includes laterally-spaced side frames 1 and 2 provided with flanged upper edges 3 and 4 which carry elongated plates or track bars 5 and 6. Movable over the track bars 5 and 6 is a conveyor carriage which comprises laterally-spaced triangular frames 7 and 8, said frames being rigidly united by a lower cross-bar 9, an upper cross-bar 10, and an intermediate cross-bar 11. As shown best in Figure 5, a cross-shaft 12 is journalled in the side frames 7 and 8 of the carriage adjacent to the track bars 5 and 6. Keyed to the cross-shaft 12 are rollers 13 which are adapted to travel over the track bars 5 and 6, said rollers being keyed to the shaft 12 on opposite sides of the frames 7 and 8. Similar carrying rollers 14 are journalled on pins 15 which project through each of the side frames 7 and 8. The rollers 13 and 14 adapt the carriage to move to and fro on the track bars 5 and 6 for moving the blank-feeding mechanism into and out of operating relation to another machine such as that shown and described in my above-identified copending application, Serial No. 669,156. Referring now to Figure 2 of the drawings, an endless conveyor may be constructed as follows. A plurality of laterally-spaced endless belts or chains 16 are mounted upon and driven by sprocket wheels 17 keyed to a sprocket drive shaft 18 and sprocket wheels 19 keyed to a second sprocket drive shaft 20, slack take-up sprocket wheels 21 being mounted upon a cross-shaft 22 which is freely journalled in the outer ends of hanger arms 23 which may be clamped in any desired angular position on a cross-bar 24. As shown best in Figures 8 and 9 of the drawings, the sprocket drive shaft 18 carries a bevel gear 18$^a$ which meshes with a bevel gear 18$^b$ keyed to a connecting power shaft 18$^c$. Keyed to the rear end of power shaft 18$^c$ is a bevel gear 18$^d$ which meshes with a bevel gear 18$^e$ on the rear sprocket drive shaft 20. As shown in Figure 10 of the drawings, the bevel gear 18$^e$ is freely journalled on the outer end of shaft 20, said gear being provided with a coupling flange 18$^f$ which forms a circular recess for receiving a flange 18$^g$ of a detachable hub 18$^h$. Said hub 18$^h$ may be secured to the shaft 20 in any desired position by means of a set screw 18$^i$. The coupling flanges 18$^f$ and 18$^g$ may be releasably locked together by means of cap screws 18$^k$. Secured to the cross-bars 9, 10 and 11, are a plurality of rigid supports or rails 25 which extend substantially the full distance between the upper sprocket wheels 17 and lower sprocket wheels 19 and are arranged immediately below the respective upper runs of the endless chain 16 for firmly supporting said chains between said sprocket wheels. At regularly spaced intervals, as shown best in Figure 3, the endless chains 16 are connected together by transversely arranged blank-feeding members or bars 26 which extend across and are slidably supported by a plurality of longitudinal plates or table sections 27 arranged intermediately with respect to the endless chains 25. As shown in Figures 2 and 5, each of the blank-feeding members or bars 26 is rigidly connected to a link in each of the endless chains 16 by means of a rigid yoke or bracket 28. Secured to each of the bars 26 are oppositely arranged blank-engaging claws or fingers 29 which are adapted to overhang and confine the rear edges of the blanks as they move upwardly over the feed table comprising the plates 27. The sprocket drive shaft 18 is preferably connected to suitable sheet-forwarding feed rolls through a vernier adjustment connection and suitable connecting gears whereby the transverse blank-feeding bars 26 may be accurately timed with respect to other mechanisms to which the sheets are to be transmitted in timed registry to the operations of said other mechanisms.

As shown in Figure 5 of the drawings, the upper forward drive shaft 18 for the endless conveyor, extends through the side frame 8 of the carriage and carries at its outer end a hand wheel 30 which is keyed to said shaft. Freely journalled upon the outer end of the shaft 18 and laterally abutting against a disk 31 which is integrally formed with the hand wheel 30, is a disk 32 which is provided with a circular slot 33 (see dotted lines in Figure 5). The circular slot 33 is constructed with a T-shaped cross-section opening outwardly to the side face of the disk 32 for the reception of the head ends of a plurality of bolts 34 which extend through the disk 31 and are releasably secured in any adjusted position around the slot 33 by means of nuts 35. As shown in Figure 4 of the drawings, the slotted disk 32 is provided with a peripheral scale 32$^a$ by means of which the larger adjustments of the drive shaft 18 and endless conveyor may be measured in conjunction with a pointer 36 which is rigidly mounted upon the conveyor carriage. An arcuate plate 31$^a$, which is mounted upon the outer periphery of the disk 31, is adapted to measure refined adjustments between the drive shaft 18 and the feed rolls to be presently referred to. Secured to the inner face of the graduated disk 32 and rotatable freely therewith on the drive shaft 18, is a spur gear 37 which meshes with and is driven by an idler spur gear 38 (see Figure 1). The idler gear 38 is driven by a spur gear 39 keyed to the outer end of a lower feed roll shaft 40. Secured to the feed roll shaft 40 is a lower feed roll 41 and on the left end of the feed roll shaft, according to Figure 5, is keyed a spur gear 42 (shown in dotted lines in Figure 2). The spur gear 42 meshes with an idler gear 43 which in turn meshes with a second idler gear 44, the latter gear 44 being in mesh with a spur gear 45 which is keyed to the shaft 46 of an upper feed roll 47, said upper feed roll 47 being arranged to cooperate with the lower feed roll 41 in positively gripping the blanks in the horizontal plane in which they are delivered to and moved through another machine such as that shown in my above-identified application, Serial No. 669,156. The feed rolls 41 and 47 may be considered as the receiving feed rolls and are suitably arranged to transmit the blanks to a pair of delivery feed rolls 46$^a$ and 46$^b$. As shown in Figures 1 and 2 of the drawings, the other machine to which the blanks are delivered, and by which the blank-feeding mechanism may be driven, is represented by upper and lower spur gears 48 and 49 which in the present embodiment of my invention correspond to the spur gears mounted on the upper and lower creaser shafts shown and described in my above-identified application, Serial No. 669,156. Suitable power connections for driving the delivery feed rolls 46$^a$ and 46$^b$ in timed relation with the feed rolls 41 and 47, may be provided by connecting the upper delivery feed roll 46$^a$ to the spur gear 48 through an interposed idler 50. The lower spur gear 49 meshes into an idler gear 51 which drives a pinion 52 on the shaft of the lower feed roll 46$^b$. As shown in Figure 1 of the drawings, the idler gear 51 meshes with the spur gear 39 on the lower feed roll shaft 40.

Rigidly mounted on the opposite side frames 7 and 8 of the endless conveyor carriage, are bracket arms 53 and 54 which carry two transverse tie-rods 55 and 56. Referring now to Figures 3 and 6 of the drawings, a plurality of ironing bars 57 are arranged in laterally-spaced order transversely of the endless conveyor, each of said bars 57 being pivotally suspended at 58 and 59 in the lower ends of two bracket arm supports 60 and 61 which may be releasably secured in different angular positions on the tie-rods 55 and 56 by means of hand wheel screws 62 and 63. As indicated in dotted lines in Figure 6 of the drawings, the amount of space between each ironing bar and the common plane of the feed table sections 27, may be adjusted by changing the positions of the bracket arms 60 and 61 on said tie-rods. Each of the ironing bars 57 is provided with an upwardly deflected end 57$^a$ presented toward the approaching blank as it moves upwardly under the propulsion of the endless conveyor. Said ironing bar is also provided with an upwardly deflected upper end 57$^b$ which permits sufficient play of the forward edge of the blank in moving into the bite of the receiving feed rolls but at the same time preventing undue displacement of said blank. Suitable means for retaining the blanks in close contact with the transverse feeding bars 26 along their rear edges for the purpose of registering said blanks squarely with respect to the feed rolls while at the same time maintaining the rear edges of said blanks under the claws or fingers 29 to prevent an upward displacement thereof, may be provided in the manner shown in Figures 3 and 7 of the drawings. Thus, a series of narrow plates 64 may be suspended from the tie-rods 55 and 56 between adjacent ironing bars 57. Said plates 64 may constitute the backs of a battery of narrow brushes or sweeps 65, said brushes being adjustably connected by angle brackets 66 to angularly adjustable supports 67 by means of screw and slot connections.

Referring now to Figures 1 and 2, it will be seen that while the endless conveyor has its upper run moving forwardly and upwardly in an inclined plane toward the receiving feed rolls, the rear end of the feed table may be arranged at suitable height to project under a stock supporting table 68 carried by side frames 69, the stock table 68 being of convenient height for permitting the blanks to be lifted therefrom by hand into the path of a blank-feeding bar 26 and with the rear edge of said blank under the forwardly projecting ends of the claws or fingers 29. With sheets having a given width in the direction in which they are to be fed to and through another machine, the blank-feeding bars 26 may be set by a graduated scale on the inclined feed table so that the sheets propelled thereby will be accurately registered through the vernier connection and connected feed rolls with respect to the timed operations of another machine. During the movement of each blank up the incline, its forward edge is brought into engagement with the upwardly deflected lower ends 57$^a$ of the ironing bars 57 and gradually brought into flat engagement with the feed table and into the constricted channels formed between the ironing bars 57 and said feed table. As each blank enters these constricted channels, its forward edge is engaged by the laterally spaced narrow brushes 65 which operate to take up any lost play between the rear edge of the blank and the claws or fingers 26 and thus impose a sufficient constraint upon the web to remove therefrom all curl or warp. In consequence, the forward edge of the blank is in proper registry to be delivered to the receiving feed rolls and forwarded by them to other mechanisms which operate in timed sequence to perform desired operations on said blanks such, for example, as those shown and described in my copending application, Serial No. 669,516, identified above.

From the foregoing description of my improved blank-feeding mechanism, it will be understood that the blanks are automatically brought into a predetermined timed relation to certain operations to be performed thereon in a machine to which the blanks are to be delivered. For this purpose, the blank-feeding mechanism is provided with paired feed rolls arranged to be driven by the machine to which the blanks are to be delivered, while at the same time the adjustable vernier connection which is interposed between the feed rolls and the blank conveyor enables the accurate timing of the blank-pushing bars in relation to the timed movement of the feed rolls. For high speed feeding mechanisms of this character it is especially important to construct and support the endless conveyor in such a way that the impact thereon by the relatively heavy blanks, will not seriously deflect, interrupt, or in any other way interfere with its travel at uniform velocity while delivering the blanks to the feed rolls. For this purpose, separate rigid supports for the upper runs of the endless chains are provided while the spaced drive shafts at opposite ends of said conveyor while driven in unison, may be adjusted with respect to each other to secure the proper tension in the upper run of the endless conveyor independently of the slack take-up device which operates on the lower run of said conveyor.

I claim:—

1. In mechanism of the character described, the combination of a movable carriage, an endless conveyor mounted thereon and provided with means arranged at spaced intervals for engaging objects to be fed, spaced drive shafts for said endless conveyor, feed rolls journalled in said carriage, said feed rolls being provided with power-transmitting connections movable by said carriage into and out of position to be driven by a machine to which said objects are delivered, and adjustable power-transmitting connections between said feed rolls and one of said drive shafts whereby the spaced interval means may be located with respect to said machine while the carriage is removed therefrom.

2. In a blank-feeding machine, the combination with a pair of constant velocity feed rolls, an upwardly inclined feed table terminating adjacent to said feed rolls, a sprocket shaft rotatable about an axis adjacent to the upper forward end of said feed table, a sprocket shaft rotatable about an axis adjacent to the lower rear end of said feed table, sprocket wheels mounted on both of said sprocket shafts, power-connections between said sprocket shaft and the first-mentioned sprocket shaft, power connections between said sprocket shafts, laterally-spaced sprocket chains carried by said sprocket wheels, said feed table comprising upwardly inclined plates interposed between said upper runs of the sprocket chains, longitudinal rails for slidably supporting the upper runs of said sprocket chains, and blank-pushing bars connected to said endless chains and slidably supported by said upwardly inclined plates, said power connections between said sprocket shafts including an adjustable connection whereby said sprocket shafts may be rotatably adjusted with respect to each other.

3. In a blank-feeding machine, the combination with a conveyor frame, of a pair of receiving feed rolls journalled in said side frames, a pair of delivery feed rolls also journalled in said side frames, both pairs of said feed rolls operating in a common horizontal plane, means for driving said feed rolls in unison, an upwardly inclined feed table terminating adjacent to said receiving feed rolls, an endless conveyor drive shaft journalled in said frame at the upper forward end of said feed table, a conveyor shaft journalled in said frame at the lower rear end of said feed table, laterally-spaced endless belts carried by said shafts, longitudinal supporting rails for slidably supporting the upper runs of said endless belts, blank-pushing bars transversely connecting said endless chains, said blank-pushing bars being slidable on said upwardly inclined feed table, a power-transmitting shaft extending between said sprocket shafts, and means for connecting the opposite ends of said power-transmitting shaft to said sprocket shafts whereby they may be rotated in unison with each other, the connecting means including an adjustable coupling whereby a relative rotary adjustment of said sprocket shafts may be employed for eliminating slack in the endless chains between said sprocket wheels.

4. In a blank-feeding machine, the combination of a pair of feed rolls adapted to operate on blanks in a horizontal plane, a sprocket drive shaft journalled adjacent to said feed rolls, a second sprocket drive shaft journalled at a lower level and at a distance from the first-mentioned sprocket drive shaft, sprocket wheels mounted on both of said sprocket shafts, laterally-spaced sprocket chains driven by said sprocket wheels, longitudinal rails for slidably supporting the upper runs of said sprocket chains between said sprocket wheels, upwardly inclined plates interposed between said upper runs of the sprocket chains and extending between said sprocket wheels, blank-pushing bars transversely connecting said endless chains and movable thereby upwardly over said inclined plates, and laterally-spaced ironing bars arranged above and spaced from said upwardly inclined plates for straightening the blanks as they approach said feed rolls.

5. In blank-feeding mechanism of the character described, the combination with a frame, of an inclined feed table mounted on said frame, laterally-spaced endless belts having their upper runs arranged to travel upwardly and substantially in the plane of said inclined feed table, blank-pushing bars arranged transversely with respect to and carried by said endless belts, said blank-pushing bars being provided with forwardly presented claws spaced above the plane of said feed table, laterally-spaced brushes mounted above said feed table for retaining the rear edges of blanks in edgewise abutment with said pusher bars and below said forwardly presented claws, and laterally-spaced straightening bars arranged parallel to and spaced from said inclined feed table, the movement of said endless belts being adapted to move said blank-pushing bars under said laterally-spaced brushes and between said straightening bars and said inclined table.

6. In blank-feeding mechanism of the character described, the combination with power-transmitting gears rotatable in unison about fixed axes arranged above and below a common plane, of a carriage movable towards and away from said gears, a feed table mounted on said carriage, an endless conveyor having its upper run travelling substantially in the plane of said feed table, blank-pushing means mounted on said endless conveyor, a pair of feed rolls arranged adjacent the forward edge of said feed table, a second pair of feed rolls arranged in advance of the first-mentioned feed rolls, both pairs of said feed rolls being operative in said common plane, power-transmitting connections for rotating all of said feed rolls in unison with each other, said power-transmitting connections including upper and lower gears respectively geared to the upper and lower feed rolls of the second-mentioned pair and movable into and out of mesh with said power-transmitting gears by the movement of said carriage, a drive shaft for said endless conveyor, and a geared connection between said power-transmitting connections and said drive shaft including a vernier adjustment head whereby the endless conveyor and the blank-pushing means mounted thereon may be adjusted relatively to said feed rolls.

7. In blank-feeding mechanism of the character described, the combination with laterally-spaced track-bars, of a carriage movable on said track bars, an inclined feed table mounted on said carriage, laterally-spaced endless belts having their upper runs arranged to travel upwardly and substantially in the plane of said inclined feed table, blank-pushing bars arranged transversely with respect to and carried by said endless belts, a pair of feed rolls arranged adjacent the upper edge of said feed table, a second pair of feed rolls arranged in advance of the first-mentioned feed rolls, both pairs of said feed rolls being operative in a common horizontal plane approximately coincident with the upper edge of said feed table, power connections for rotating all of said feed rolls in unison with each other, a drive shaft for said endless belts, and power-transmitting connections between the power connections for said feed rolls and said drive shaft.

8. In blank-feeding mechanism of the character described, the combination of an endless conveyor provided with blank-feeding members arranged thereon at spaced intervals, power-driven shafts rotatable about spaced parallel axes and provided with means for rotatably supporting and driving said endless conveyor, and an interlocking geared connection between said power-driven shafts which constrains said power-driven shafts to rotate in unison with each other, said interlocking geared connection being constructed and arranged to maintain the flat forwardly moving portion of the endless conveyor extending between the supporting and driving means of said power-driven shafts substantially taut irrespective of the degree of tautness in the remainder of said endless conveyor.

9. In blank-feeding mechanism of the character described, the combination with a power-driven shaft for driving an endless conveyor for blanks, of a second conveyor shaft, a longitudinal power-transmitting shaft extending between and having its opposite ends geared to the first- and second-mentioned shafts for rotation in unison with each other, an endless conveyor provided with blank-engaging means for feeding blanks in timed sequence in respect to operations to be performed thereon, wheels mounted on said first- and second-mentioned shafts for supporting and driving said endless conveyor, means for permitting rotary adjustment between the first-mentioned and second-mentioned shafts for regulating the tension in the blank-feeding portion of said endless conveyor, upper and lower feed rolls constructed and arranged to receive blanks from said endless conveyor, and operating connections for driving said conveyor in timed relation with said feed rolls.

10. In blank-feeding mechanism of the character described, the combination with a pair of power-driven feed rolls, of an endless conveyor constructed and arranged to deliver blanks to said feed rolls, variable operating connections between said feed rolls and said endless conveyor for timing the delivery of blanks by the latter to the former, spaced conveyor shafts rotatable about parallel axes, wheels mounted on said conveyor shafts for supporting and propelling said endless conveyor, a power-transmitting shaft extending longitudinally of said endless conveyor, geared connections between opposite ends of said power-transmitting shaft and said conveyor shafts, the geared connections at one end of said power-transmitting shaft including an adjustable coupling whereby one of said conveyor shafts may be rotatably adjusted with respect to the other, means extending under and slidably supporting the forwardly moving run of said endless conveyor during its movement between said conveyor shafts.

11. In blank-feeding mechanism of the character described, an endless conveyor comprising laterally-spaced endless chains, power-driven sprocket wheel shafts arranged at the forward and rear ends of the active run of said endless chains, sprocket wheels mounted on said power-driven shafts for propelling said endless chains at both ends of said active run of the conveyor, a power-transmitting shaft extending longitudinally of said endless conveyor, geared connections between opposite ends of said power-transmitting shaft and one of said sprocket wheel shafts, the geared connections at one end of said power-transmitting shaft including an adjustable coupling whereby one of said sprocket wheel shafts may be rotatably adjusted with respect to the other of said sprocket wheel shafts for regulating the slack in the active runs of said chains, supporting rails extending longitudinally of and below the active runs of said endless chains from one sprocket wheel to the other, said supporting rails being slidably engaged by the active runs of said endless chains for rendering said chains inflexible, blank-feeding bars rigidly connected to one link of each of said laterally-spaced endless chains, and a blank-feeding table comprising rigid plates interposed between said chains and slidably supporting said blank-feeding bars.

12. In blank-feeding mechanism of the character described, the combination with a carriage movable into and out of operating position with respect to a machine to which blanks are to be fed, of a pair of cooperating feed rolls journalled in said carriage for delivering blanks to said machine, a conveyor shaft journalled in said carriage and having variably timed gear connections with said feed rolls, a second conveyor shaft, an endless conveyor provided with blank-engaging means at spaced intervals whereby blanks may be delivered to said feed rolls at timed intervals, wheels mounted on said conveyor shafts for supporting and propelling said endless conveyor, a power-transmitting shaft extending longitudinally of said endless conveyor, geared connections between opposite ends of said power-transmitting shaft and said conveyor shafts, the geared connections at one end of said power-transmitting shaft including an adjustable coupling whereby one of said conveyor shafts may be rotatably adjusted with respect to the other for regulating the slack in the active run of said conveyor, and means for slidably supporting the active run of said endless conveyor during its movement over the space between said conveyor shafts.

13. In blank-feeding mechanism of the character described, the combination with a carriage movable into and out of operating position with respect to a machine to which blanks are to be fed, of a pair of cooperating feed rolls journalled in said carriage for delivering blanks to said machine, said feed rolls being provided with geared connections movable into and out of gear with periodically rotating gears of said machine whereby said feed rolls are rotated in timed relation thereto, an endless conveyor mounted in said carriage for supplying blanks to said feed rolls, said endless conveyor comprising laterally-spaced endless chains, conveyor shafts rotatable about spaced parallel axes, sprocket wheels mounted on said conveyor shafts for supporting and propelling said endless chains, a power-transmitting shaft extending longitudinally of said endless conveyor, geared connections between opposite ends of said power-transmitting shaft and said conveyor shafts, the geared connections at one end of said power-transmitting shaft including an adjustable coupling whereby one of said conveyor shafts may be rotatably adjusted with respect to the other for regulating the slack in the active runs of said chains, supporting rails extending longitudinally of and below the active runs of said endless chains, said supporting rails being slidably engaged by the active runs of said endless chains for rendering said chains substantially inflexible, blank-feeding bar connected to said laterally-spaced endless chains, and a blank-feeding table comprising rigid plates interposed between the upper runs of said chains and slidably supporting said blank-feeding bars, one of said conveyor shafts having variably timed geared connections with said feed rolls.

14. In blank-feeding mechanism of the character described, the combination with an upwardly inclined feed table comprising laterally-spaced plates, of spaced conveyor shafts rotatable about axes respectively adjacent the upper forward and lower rear edges of said feed table, sprocket wheels mounted on said conveyor shafts in substantially the same vertical planes as the spaces between said table plates, endless chains mounted on said sprocket wheels and having their upper runs operating upwardly and forwardly between adjacent inclined plates, transverse blank-feeding bars connecting said endless chains and slidably supported by said inclined plates, supporting rails extending longitudinally of and below the active runs of said endless chains from one sprocket wheel to the other, said supporting rails being slidably engaged by the active runs of said endless chains, a power-transmitting shaft extending between said sprocket wheel shafts, and geared connections between opposite ends of said power-transmitting shaft and said sprocket wheel shafts, one of said connections including an adjustable coupling whereby one of said sprocket wheel shafts may be rotatably adjusted with respect to the other of said sprocket wheel shafts for regulating the slack in the active runs of said chains.

GEORGE W. SWIFT, Jr.